US012715970B2

(12) United States Patent
Mukhopadhyay et al.

(10) Patent No.: US 12,715,970 B2
(45) Date of Patent: Aug. 25, 2026

(54) BIODEGRADABLE AND/OR BIOCOMPATIBLE FILMS AND COATINGS WITH LOW CONTACT ANGLE HYSTERESIS FOR OMNIPHOBIC APPLICATIONS

(71) Applicant: UNIVERSITY OF CENTRAL FLORIDA RESEARCH FOUNDATION, INC., Orlando, FL (US)

(72) Inventors: Kausik Mukhopadhyay, Orlando, FL (US); Pritha Sarkar, Oviedo, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 212 days.

(21) Appl. No.: 18/427,374

(22) Filed: Jan. 30, 2024

(65) Prior Publication Data

US 2024/0254297 A1 Aug. 1, 2024

Related U.S. Application Data

(60) Provisional application No. 63/441,983, filed on Jan. 30, 2023.

(51) Int. Cl.

| | |
|---|---|
| ***C08J 7/04*** | (2020.01) |
| ***C09D 5/16*** | (2006.01) |
| ***C09D 201/00*** | (2006.01) |
| *C09D 197/02* | (2006.01) |

(52) U.S. Cl.

CPC .......... *C08J 7/0427* (2020.01); *C09D 5/1687* (2013.01); *C09D 201/00* (2013.01); *C08J 2367/02* (2013.01); *C08J 2497/02* (2013.01); *C09D 197/02* (2013.01)

(58) Field of Classification Search

CPC .. C08J 2367/02; C08J 2497/02; C08J 7/0427; C08L 101/16; C09D 197/02; C09D 201/00; C09D 5/1687

See application file for complete search history.

(56) References Cited

FOREIGN PATENT DOCUMENTS

| | | | |
|---|---|---|---|
| CN | 104704155 A | * | 6/2015 |
| DE | 102017114557 A1 | * | 1/2019 |

OTHER PUBLICATIONS

Chen, Yegao et al., "Lycopodium japonicum: A comprehensive review on its phytochemicals and biological activities", Arabian Journal of Chemistry (2020) 13, 5438-5450.

Milionis, Athanasios et al., "Superhydrophobic nanocomposites from biodegradable thermoplastic starch composites (Mater-Bi®), hydrophobic nano-silica and lycopodium spores", RSC Adv., 2014, 4, 34395-34404.

Morrissette, Jared M et al., "A methodology to produce eco-friendly superhydrophobic coatings produced from all-water-processed plant-based filler materials", Green Chem., 2018, 20, 5169-5178.

Uddin, Jasmin et al., "Investigation of the Fate of Proteins and Hydrophilicity/Hydrophobicity of Lycopodium clavatum Spores after Organic Solvent-Base-Acid Treatment", ACS Appl. Mater. Interfaces 2019, 11, 20628-20641.

Bormashenko, Edward et al., "Petal Effect" on surfaces based on Lycopodium: High-stick surfaces demonstrating high apparent contact angles, J. Phys. Chem. C 2009, 113, 5568-5572.

* cited by examiner

*Primary Examiner* — Lawrence D Ferguson
(74) *Attorney, Agent, or Firm* — Timothy H. Van Dyke; Wolter Van Dyke Davis, PLLC

(57) ABSTRACT

This invention relates to a biodegradable hydrophobic or omniphobic coating with tailorable properties for various applications. The technology's hydrophobic modifications, surface functionalization, and surface roughness modifications enable low contact angle hysteresis for easy roll-off and self-cleaning properties. The composite is based on polymer substrate(s) or functionalized polymer substrate(s), filler(s), inorganic(s), binder(s), *Lycopodium*, or a combination of materials. The *Lycopodium* may be functionalized with suitable end groups for better adhesion or to impart beneficial properties. The polymer(s) and other constituents may be deposited on the substrate by various methods including spin coating, dip coating, spray coating, sputter coating, electrospinning, solvent casting, or extrusion. Binders and chemicals are incorporated in suitable chronology with or without the solvents of choice.

6 Claims, No Drawings

BIODEGRADABLE AND/OR BIOCOMPATIBLE FILMS AND COATINGS WITH LOW CONTACT ANGLE HYSTERESIS FOR OMNIPHOBIC APPLICATIONS

FIELD OF THE INVENTION

This invention relates to a biodegradable hydrophobic or omniphobic coating with tailorable properties for various applications, in particular to a composite based on polymer substrate(s) or functionalized polymer substrate(s) comprising filler(s), inorganic(s), binder(s), *Lycopodium,* or a combination thereof.

BACKGROUND

Due to the alarming concerns related to the detrimental effect of polymers and plastics on the environment, there is an undeniable need for development of biofriendly, green alternatives of polymer-based materials for myriads of applications.

Creating superhydrophobic features is an irrefutable requirement for such applications in many fields that include healthcare, automotive and aerospace industries, packaging, textiles, coatings, adventure sports and more.

Unfortunately, most of the constituents used for the fabrication of hydrophobic materials are still plastic based, a majority of which come from petroleum and related fractions. Biopolymers, although environment-friendly, tend to be hydrophilic, thereby lacking sufficient mechanical integrity for such materials.

*Lycopodium* is a plant extract of tropical and subtropical origin found in many parts of Asia. It has been used for its medicinal value for centuries in traditional Chinese and Indian medicine. It has been shown to have many benefits including anticancer, antioxidant, and anti-inflammatory properties. Over the years, *Lycopodium* has also garnered much interest from researchers due to its interesting hydrophobicity and unique structure which imparts its 'sticky' super-hydrophobicity, or commonly referred to as the rose petal effect.

SUMMARY

Technical Problem

As for films or coatings, most existing technologies have focused on polymers and fluorinated substances which are not biodegradable, and some existing biodegradable coatings have focused on hydrophobic but not on superhydrophobic, extreme repellency nor low contact angle hysteresis features of the surfaces or coatings. Although some existing research has reported superhydrophobic and highly water-repellent coatings, they are mostly based on static contact angles.

Further, although the biocompatible properties of *Lycopodium* are intriguing, there has not been any significant research on using its properties for translation into a superhydrophobic film for industrial application, and existing research on *Lycopodium* composites has been based on aggregates rather than uniform and durable coatings or films.

Technical Solution

This invention aims at creating a biodegradable hydrophobic or omni-phobic coating with tailorable properties for various applications. In addition, hydrophobic modifications, surface functionalization, and surface roughness modifications will allow for low contact angle hysteresis for easy roll off and self-cleaning properties.

In accordance with an aspect of the present invention, our technology is based on the effects of dynamic contact angles and contact angle hysteresis values to determine super-repellent behavior of the coated surfaces.

Advantageous Effects

The disclosure here provides a composite for coating substances with advantageous features of biodegradability and biocompatibility, inexpensive and easy fabrication, flexibility in addition to the above-mentioned features.

Based on these features, this invention can be used for coatings of commercial environmental waterproof products, such as wearable hydrophobic fabrics and bandages for wound healing applications, biosafe superhydrophobic coatings of pipelines and related medical applications, water marbles, and other materials of dust repellent, self-cleaning and anti-fouling films, which can be discarded easily due to their biodegradability

DETAILED DESCRIPTION

A biocompatible superhydrophobic or highly repellent coating system is the holy grail in paints and coating industries, most importantly in the healthcare industries. Such a coating system will pave the way for usage in medical applications and in textile coatings that directly impact the skin or human body.

Thus, one objective of the invention is to provide composites for biosafe coatings having (super)hydrophobic/(super)oleophobic/(super) omniphobic property as well as to provide coating methods thereof.

The composites disclosed herein may also possess a property of low contact angle hysteresis on patterned surfaces, and because it is a porous superhydrophobic coating substance, it is good for breathability. In addition, it is possible to introduce bioactive agents in the composite to complement application in medicine and healthcare.

The formulation of the proposed composite is based on a polymer substrate(s) or functionalized polymer substrate(s), filler(s), inorganic(s), binder(s), *Lycopodium,* or combination thereof. The *Lycopodium* may be functionalized with suitable end groups for better adhesion and/or to impart beneficial properties.

According to one embodiment, provided is a composite of biodegradable coatings having low contact angle hysteresis for omni-phobic applications. The composite includes (i) one or more polymer substrates, (ii) one or more functionalized polymer substrates and/or (iii) *Lycopodium,* functionalized *Lycopodium* or any derivative of *Lycopodium japonicum.* In a specific example, the concentration of the polymer substrate(s) is 0-99% by weight with or without suitable solvent(s), and the concentration of *Lycopodium* or functionalized *Lycopodium* or any derivative of *Lycopodium japonicum* is 1-40% by weight of the composite. In a further example, the composite may also comprise one or more filler(s), one or more inorganic(s), one or more binder(s), or combination thereof, which will be incorporated in suitable chronology with or without solvents of choice. In a more specific example, the concentration of the one or more filler(s) is 0-25% by weight, the concentration of the one or more inorganic(s) is 0-25% by weight, and the concentration of the one or more binder(s) is 0-25% by weight. Binders and chemicals may be incorporated in suitable chronology with or without solvents of choice.

The composite embodiments disclosed herein may further include one or more bioactive agent(s), wherein the concentration of the bioactive agent(s) is 0-25% by weight. The composite may further include one or more hydrophobicity modifier(s), wherein the concentration of the hydrophobicity modifier(s) is 0-25% by weight.

According to certain method embodiments, provided is a method for depositing composite disclosed herein on to a substrate. The method may involve depositing onto the substrate via spin coating, dip coating, spray coating, sputter coating, electrospinning, solvent casting, and/or extrusion.

According to certain embodiments, a formulation for a composite is disclosed. An example of a composite formulation is as follows:

i) Calculated concentration (0-99% by weight) of at least one polymer substrate with or without suitable solvent(s);
ii) Calculated concentration (1-40% by weight) of *Lycopodium* or functionalized *Lycopodium* or any derivative of *Lycopodium japonicum;*
iii) optionally, calculated concentration (0-25% by weight) of at least one filler;
iv) optionally, calculated concentration (0-25% by weight) of at least one binder;
v) optionally, calculated concentration (0-25% by weight) of at least one inorganic;
vi) optionally, calculated concentration (0-25% by weight) of at least one bioactive agent; and
vii) optionally, calculated concentration (0-25% by weight) of at least one hydrophobicity modifier.

According to certain method embodiments, disclosed is a method that involves mixing an amount of *Lycopodium* with a polymer substrate/solvent mixture to form a composite. In a specific example, the polymer substrate/solvent mixture comprises about 5 to about 20% (w/v) polymer substrate. In a more specific embodiment, the polymer substrate includes polycaprolactone, polydimethylsiloxane, polyurethane, or polylactic acid, or a combination thereof. In one example, the amount of *Lycopodium* is mixed with the polymer substrate solvent mixture at about 10 to about 20% (w/w). The method may further comprise coating a substrate with the composite. Other embodiments include a substrate coated with a composite described herein.

Polymer Substrates

As used herein, the term "polymer" refers to any of a class of natural or synthetic substances composed of very large molecules, called macromolecules, that are composed of multiples of unspecified number of simpler chemical units called monomers. In the context of composite embodiments described herein, the term "polymer substrate" refers to the polymer that is included in the composite, which, in turn, can i be used to coat an object or surface which is generally referred to herein as a "substrate." Examples of substrates onto which composite embodiments are coated include, but are not limited to, fabrics, glass, and metals (e.g. aluminum) or some combination thereof, or objects possessing such surface materials. The four basic polymer structures are linear, branched, crosslinked, and networked. Polymers are not restricted to monomers of the same chemical composition or molecular weight and structure. Some natural polymers are composed of one kind of monomer. Most natural and synthetic polymers, however, are made up of two or more different types of monomers; such polymers are known as copolymers. Common examples of synthetic polymers that can be used as substrates include, but are not limited to, polyesters (e.g., polycaprolactone (PCL), polylactic-co-glycolic acid (PLGA)), polycyanoacrylates, polyalkyleneoxides, polyurethane, polyethylene glycol (PEG), polyethylene oxide (PEO), polyacrylamide (PAM), polyethylene terephthalate (PET), polydioxanone (PDS), polySTAT, poly-2-oxazoline (POx), siloxane, etc. (Ghimire S, Sarkar P, Rigby K, Maan A, Mukherjee S, Crawford K E, Mukhopadhyay K. Polymeric Materials for Hemostatic Wound Healing. Pharmaceutics. 2021 Dec. 9; 13(12):2127; Mukhopadhyay, K.; Kasthuri, R.; Sudarshan, T. S. Siloxane-based artificial blockage to control bleeding. U.S. Patent No. 009707251B2, 18 Jul. 2017). In specific embodiments, the polymer used as a polymer substrate is polycaprolactone, polydimethylsiloxane, polyurethane, or polylactic acid.

*Lycopodium*

*Lycopodium* is a genus of clubmosses, also known by some other names such as ground pines, in the family Lycopodiacace. *Lycopodium* is one of nine genera in the subfamily Lycopodioideae and has from 9 to 15 species. In other classifications, the genus is equivalent to the whole of the subfamily, since it includes all of the other genera. There are more than 40 recognised species.

The term "*Lycopodium*" as used herein refers to *Lycopodium* powder. *Lycopodium* powder is typically a yellow-tan dust-like powder, comprising dry spores of the clubmoss plants, or various fern relatives principally in genera *Lycopodium* and *Diphasiastrum.* One variant *Lycopodium japonicum* (*L. japonicum*) has been studied comprehensively for all its chemical components, phytochemicals, and biological activities. The study reports that to date, 132 compounds have been isolated and identified from the club moss of *L. japonicum,* including 83 alkaloids, 36 triterpenoids, two diterpenoids, one sesquiterpenoid, two sterols, four flavans, two diaryl propanes, one anthraquinone and one phthalate. It was seen alkaloids and serratane-type triterpenoids are the dominant chemical constituents in the plant *L. japonicum.* ["*Lycopodium* L." Plants of the World Online. Royal Botanic Gardens, Kew. Retrieved 2019-12-09. Hassler, Michael (5 Dec. 2021), "*Lycopodium*", World Ferns. Synonymic Checklist and Distribution of Ferns and Lycophytes of the World; Chen et al., *Lycopodium japonicum:* A comprehensive review on its phytochemicals and biological activities, Arabian Journal of Chemistry, 2020.] *Lycopodium* can also be functionalized. Direct fluorination, direct methylation or adding bulkier carbon/silicon/phosphorus/nitrogen based organic groups through chemical functionalization are examples of approaches to functionalize *Lycopodium* for even better hydrophobic or non-wetting performance.

Hydrophobicity Modifiers

Adding fluorinated compounds (including POSS, SiO2. clay etc.) would also impart hydrophobicity, that is, they can be considered hydrophobicity modifiers. The way modifiers typically work is by changing the functionality, free energy, and wetting paradigms of the surfaces that could possibly alter the states from Wenzel to Cassie Baxter regime, or vice versa.

Other materials that can be added to the formulation increase hydrophobicity include, but are not limited to, carbon nanotubes, graphite, graphene, fullerenes, and functionalized carbon species. Materials lacking O or OH functional groups would be believed to higher hydrophobicity. The high-density packing fraction on the coated surface, their smaller size and varying shapes could also impart higher hydrophobicity and lower contact angle hysteresis—both are criteria for better repelling factor in contact with any liquid.

Fillers

Examples of fillers for use in formulations or compositions described herein include but are not limited to polymers, surfactants, metal organic frameworks, organic alkanes, alkynes, alkenes, aromatics, or mixtures thereof.

Binders

Examples of binders for use in formulations or compositions described herein include but are not limited to silicates, zeolites, clays, oxides, carbides, hydroxides, halides, pseudohalides, or mixtures thereof.

Bioactive Agents

Examples of bioactive agents for use in formulations or compositions described herein include but are not limited to amines, amino acids, nucleic acids, enzymes, nanoparticles, and/or nanoparticle loaded polymers. Bioactive agents may include polymers that are responsive to enzyme, drugs, biomacromolecules, vitamins, phytochemicals etc.

Solvents

Examples of solvents for use in formulations or compositions described herein include but are not limited to tetrahydrofuran; toluene; benzene; 1,1,1 Trichloroethane; xylene; carbon tetrachloride; ethyl acetate; chloroform; trichloroethylene; cellosolve® acetate; methyl ethyl ketone; acetone; diacetone alcohol; ethylene dichloride; methylene chloride; butyl cellosolve®; water; glycerol; or ethylene glycol; or a combination thereof.

Binders

Examples of binders useful in formulations or compositions described herein include but are not limited to polyurethane resins, polyvinylchoride resin, polyester resins, polycarbonate resins, cellulose resins (e.g., nitrocellulose), epoxy resins, phenoxy resins, polystyrene base resins, polyvinyl fluoride resins, silicone resins, electron beam-curing acrylic resins and the like.

Implementations

Composite embodiments are useful for a number of implementations. For example, the composite can be coated onto fabrics, such as a wearable fabric. The composites can also be coated onto bandages or similar wound dressings for wound healing applications. The composites may also be coated in pipes, conduits and the like that involve transfer of fluids.

Accordingly, in certain embodiments, provided is a bandage onto which a composite described herein is coated. The bandage can also include a dressing or absorbent material attached to the material. The dressing or absorbent material can be attached to a side of the material opposite the first surface. The bandage can be a bandage selected from the group consisting of an adhesive bandage, a compression bandage, a wrap, gauze, medical tape, an orthopedic cast, and combinations thereof. The invention also includes a method of making a bandage having a water repellant surface. The method can include providing a material and coating a first surface of the material with a composite described herein.

In more specific embodiments, the bandage can include a material, including but not limited to, porous or perforated films, textiles, nonwoven materials, impregnated composites thereof, and combinations thereof. The bandage can include an elastic material, such as a woven material containing elastomeric fibers, or a laminate of one or more bandage layers with one or more elastomeric layers. Composite-coated bandages can include orthopedic casts and similar bandages. As used herein, the term bandage is intended to include wraps that are applied over existing bandages in order to prevent saturation of the underlying bandage.

According to other embodiments, provided is a fabric having a surface onto which a composite described herein is coated. The fabric may be selected from one or more of woven materials, non-woven materials, and/or melt blown materials, such as woven fabrics, non-woven fabric, melt-blown fabrics, woven synthetic and natural fibers, non-woven synthetic and natural fibers, polymers (including copolymers, tripolymers, and higher-order polymers), paper, cellular plastics, or combinations thereof. In some embodiments, the substrate includes one or more porous materials. The fabric can be in the form of a one-ply, two-ply, or multi-ply fabric, fiber, polymer, etc. In at least one embodiment, the substrate is formed as a laminate of a plurality of layers. In these and other embodiments, one or more layers of the plurality of layers is coated with particles as described herein.

Illustrative, but non-limiting, examples of materials useful as a fabric include natural fibers/polymers such as cellulosic fibers and proteinacious fibers, e.g., wool, silk, cotton, hemp, and combinations thereof. Illustrative, but non-limiting, examples of materials useful as a substrate also include synthetic fibers/polymers such as polymers (homopolymers or copolymers), such as polyamides including nylon (such as nylon 6 and nylon 66), poly(p-phenylene terephthalamide) (e.g., Kevlar™, Twaron™) and poly (m-phenylenediamine isophthalamide) (e.g., Nomex™); polyolefins such as polypropylene; polyesters such as polyethylene terepthalate (PET); polyureas and block copolymers thereof such as polyurethaneureas; polyurethanes, including polyurethane block copolymers; polyethers, including polyether copolymers such as polyether-polyurea copolymers; acrylics; synthetic cellulose-derived fibers such as rayon; and combinations thereof. In some embodiments, the material or combinations of materials can be woven, non-woven, knitted, felted, thermally bonded, hydroentangled, spunbonded, meltblown, electrospun or formed by other nonwoven processes, or combinations of processes, into, e.g., a fiber, filament, or a fabric. Fabrics coated with one or more composite embodiments described herein may pertain to a wearable garment such as face coverings (e.g., facemasks, face shields, respirators, surgical masks, bandanas), coat, pants, apron, gowns, gloves and the like.

In yet other embodiments, a pipe or conduit is provided wherein a composite described herein is coated on a inner and/or outer surface thereof. Examples of pipes include metal or polymer pipes for transferring fluids from one location to another. A conduit may include ducts for HVAC systems. The coating may serve to improve efficiency of fluid transfer or to reduce growth of microorganisms thereon.

EXAMPLES

Formulation Example: 10% (w/v) polycaprolactone in dichloromethane. 15% *Lycopodium* (w/w) mixed to polycaprolactone solution. Polysorbate 80 added as a binder and surfactant. The Mixture is spin-coated on surfaces of interest—Fabrics, glass, aluminium

REFERENCES

1. Chen et al., *Lycopodium japonicum:* A comprehensive review on its phytochemicals and biological activities, Arabian Journal of Chemistry, 2020.
2. Bormashenko et al., "Petal Effect" on Surfaces based on *Lycopodium:* High Stick surfaces demonstrating high apparent contact angles, Journal of Physical Chemistry C, 2009.
3. Milionis et al., Superhydrophobic nanocomposites from biodegradable thermoplastic starch composites (Mater-Bi®), hydrophobic nano-silica and *Lycopodium* spores, RSC Advances, 2014.

What is claimed is:

1. A composite for producing biodegradable coatings having low contact angle hysteresis for omni-phobic applications, the composite comprising (i) at least one polymer substrate and/or at least one functionalized polymer substrate, and (ii) *Lycopodium*, functionalized *Lycopodium* and/or or any derivative of *Lycopodium japonicum,* wherein the concentration of polymer(s) is 0-99% or 1-99% by weight with or without suitable solvent(s), and wherein the concentration of *Lycopodium* or functionalized *Lycopodium* and/or any derivative of *Lycopodium japonicum* is 1-40% by weight, wherein the polymer substrate is selected from the group consisting of polycaprolactone, polydimethylsiloxane, polyurethane, or polylactic acid.

2. The composite according to claim 1, wherein the composite further comprises at least one filler, at least one inorganic, or at least one binder, or combination thereof, which are incorporated in suitable chronology with or without solvents of choice, wherein the concentration of the at least one filler is 0-25% by weight, wherein the concentration of the at least one inorganic is 0-25% by weight, or wherein the concentration of the at least one binder is 0-25% by weight.

3. The composite of claim 1, wherein the composite further comprises at least one bioactive agent, wherein the concentration of the at least one bioactive agent is 0-25% by weight.

4. The composite of claim 3, wherein the at least one bioactive agent is selected from the group consisting of amines, amino acids, nucleic acids, enzymes, nanoparticles, and/or nanoparticle loaded polymers.

5. The composite of claim 1, wherein the composite further comprises at least one hydrophobicity modifier, wherein the concentration of the at least one hydrophobicity modifier is 0-25% by weight.

6. The composite of claim 5, wherein the hydrophobicity modifier is selected from the group consisting of fluorinated compounds, carbon nanotubes, graphite, graphene, fullerenes, and functionalized carbon species.

* * * * *